(12) United States Patent
Matsuo et al.

(10) Patent No.: US 7,651,149 B2
(45) Date of Patent: Jan. 26, 2010

(54) WINDSHIELD UNIT FOR SADDLE-RIDE TYPE VEHICLE

(75) Inventors: Hisashi Matsuo, Saitama (JP); Yukinori Kurakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/251,621

(22) Filed: Oct. 15, 2008

(65) Prior Publication Data
US 2009/0108620 A1  Apr. 30, 2009

(30) Foreign Application Priority Data
Oct. 31, 2007  (JP) ............................. 2007-283857

(51) Int. Cl.
*B62J 17/04*  (2006.01)
(52) U.S. Cl. .................................................... 296/78.1
(58) Field of Classification Search .................. 296/78.1
See application file for complete search history.

(56) References Cited

U.S. PATENT DOCUMENTS

| 7,261,358 B2 * | 8/2007 | Kurakawa et al. ........... 296/78.1 |
| 2008/0079285 A1 * | 4/2008 | Ueda et al. ................. 296/180.1 |
| 2008/0185865 A1 * | 8/2008 | Matsuo et al. .............. 296/78.1 |

FOREIGN PATENT DOCUMENTS

| EP | 1 759 969 A1 | 3/2007 |
| JP | 2006-36062 A | 2/2006 |

* cited by examiner

*Primary Examiner*—Joseph D Pape
(74) *Attorney, Agent, or Firm*—Birch, Stewart, Kolasch & Birch LLP

(57) ABSTRACT

In a windshield unit for a saddle-ride type vehicle provided at the front center of a vehicle body with an air duct for directing the air flow from the front of the vehicle toward the upside, a screen is provided at the front center of a vehicle body with an air duct adapted to lead the air flow from the front of the vehicle toward the upside, a straight portion of the air duct rising in front of an occupant so that a left-right width of a rear wall rearwardly of the straight portion may be narrower than the left-right width of a front wall forward of the straight portion.

20 Claims, 5 Drawing Sheets

WINDSHIELD UNIT FOR SADDLE-RIDE TYPE VEHICLE

CROSS-REFERENCE TO RELATED APPLICATIONS

The present application claims priority under 35 USC 119 to Japanese Patent Application No. 2007-283857 filed on Oct. 31, 2007 the entire contents of which are hereby incorporated by reference.

BACKGROUND OF THE INVENTION

1. Field of the Invention

The present invention relates to a windshield unit for a saddle-ride type vehicle.

2. Description of Background Art

A windshield unit (screen) is known for a saddle-ride type vehicle that is provided at the front center of a vehicle body with an air duct adapted to allow an air introduction port opening forward of the vehicle to communicated with an air blowout port opening upward of the vehicle. See, for example, Japanese Patent Laid-Open No. 2006-36062.

This windshield unit directs the air flow from the front of the vehicle toward the upside through the air duct to suppress the height of a windshield and further to enhance a windshield effect, compared with a general windshield unit not having the air duct.

However, the windshield unit described above increases the thickness corresponding to that of the air duct. In particular, there is a possibility that left and right lateral walls of a portion rising in front of an occupant are likely to come into sight through the windshield. It is desired to improve such a point.

SUMMARY AND OBJECTS OF THE INVENTION

Accordingly, it is an object of an embodiment of the present invention to make it difficult for the left and right lateral walls of a portion rising in front of an occupant to come into sight through a windshield in a windshield unit for a saddle-ride type vehicle provided at the front center of a vehicle body with an air duct adapted to direct the air flow from the front of the vehicle toward the upside.

According to an embodiment of the present invention, a windshield unit 25, 125 for a saddle-ride type vehicle, for example, a motorcycle 1, provided at the front center of a vehicle body with an air duct 31, 131 adapted to allow an air introduction port 32 opening forward of the vehicle to communicate with an air blowout port 33 opening upward of the vehicle. The air duct includes an introduction portion, for example, the curved portion 31*a* extending rearwardly from the air introduction port and a rising portion, for example, the straight portion 31*b*, 131*b*, being contiguous with the introduction portion, rising in front of an occupant, and reaching the air blowout port, and the rising portion is provided so that a left-right width H2, H4 of a rear wall 35 may be narrower than a left-right width H1, H3 of a front wall 36 forward of the rising portion.

According to an embodiment of the present invention, left and right lateral walls 37, 137 of the rising portion is slantly provided to gradually narrow an interval therebetween as the left and right lateral walls go rearward.

According to an embodiment of the present invention, an angle θ1 to θ3 formed between the left and right lateral walls is set in a range from 25° to 35°.

According to an embodiment of the present invention, the left and right width of each of the left and right lateral walls in the rising portion rising in front of the occupant is suppressed when the left and right lateral walls are viewed from the occupant's view point. This broadens the sight through the windshield to enhance a sense of space at the riding position.

According to an embodiment of the present invention, the left and right lateral walls of the rising portion in front of the occupant are slanted to extend along the line of sight extending from the occupant's view point rearwardly of the left and right lateral walls. Therefore, the left-right width of each of the left and right lateral walls can be further reduced when the left and right lateral walls are viewed from the occupant's point.

According to an embodiment of the present invention, the left-right width of each of the left and right lateral walls can be reduced with respect to the occupant's view point located in a standard range rearward of the rising portion when the left and right lateral walls of the rising portion are viewed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
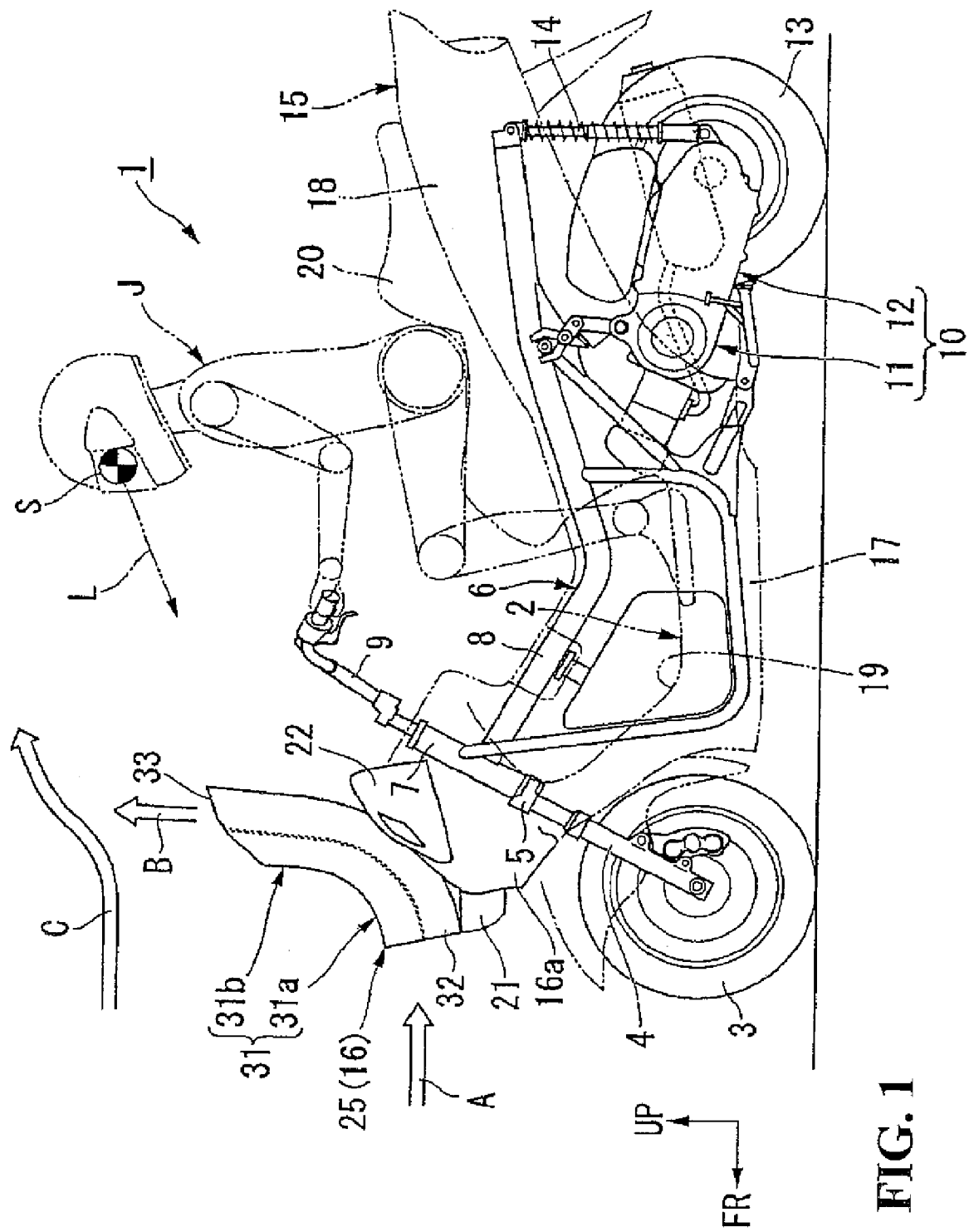
FIG. 1 is a left lateral view of a motorcycle according to an embodiment of the present invention.

Embodiments of the present invention will hereinafter be described with reference to the drawings. It is to be noted that the orientations such as the front, back or rear, left, right, etc. in the following description are the same as that of a vehicle unless otherwise explained. In addition, arrows FR, LH and UP in the drawings denote the front, left and upside, respectively, of the vehicle.

A motorcycle (a saddle-ride type vehicle) 1 illustrated in FIG. 1 is, for example, a scooter type vehicle having a low-floor 2. A front wheel 3 of the motorcycle 1 is rotatably supported by a telescopic front fork 4. The front fork 4 is steerably supported by a head pipe 7 located at a front end of a body frame 6 via a steering stem 5. The body frame 6 includes a main pipe 8 extending rearward downward from the head pipe 7, then bending, and further extending rearwardly and upwardly. Steering handlebars 9 are attached to the upper end of the steering stem 5.

A swing unit 10 is supported by the rear portion of the body frame 6 so as to be swingable around its front end. The swing unit 10 is integrally composed of an engine 11 and a power transmission mechanism 12. A rear wheel 13 which is a drive wheel is attached to an output shaft located at the rear end of the swing unit. A shock-absorbing rear cushion 14 is disposed between the rear end of the swing unit 10 and the rear end of the body frame 6.

The body frame 6 is covered by a body cover 15 made mainly of a synthetic resin. The body cover 15 mainly includes a front cover (front cowl) 16; an under cover 17; a rear cover 18; and a floor cover 19. The front cover 16 covers the front portion of the body frame 6 so as to extend from the front thereof to the left and right sides thereof. The under cover 17 is continued from the lower portion of the front cover 16 to cover the lower portion of the body frame 6. The rear cover 18 covers the rear portion of the body frame 6. The floor cover 19 covers a portion extending from the rear portion of the front cover 16 to the upper portion of the under cover 17.

A seat 20 for occupants (driver and pillion) is disposed above the rear cover 18 so as to be able to open and close an article storage chamber (not shown) in the rear cover 18. An occupant (the driver) J sitting on the front portion of the seat 20 puts her or his hands on the left and right grips of the handlebars 9 and assumes such a driving posture as to put her or his feet on the left and right upper surfaces of the floor cover 19. A front cover 16 is located in front of (forward of) the occupant J located at such a riding position to reduce an air flow pressure against the occupant J.

The upper portion of the front cover 16 is constructed as a screen 25 made of a transparent or semi-transparent transmissive resin such as e.g. polycarbonate. Although the occupant J can visibly recognize the front of the vehicle through the screen 25, the upper edge of the screen 25 (the front cover 16) is set to such a height so as not to shield the front view of the occupant J (to such a height as to correspond to a breast). In addition, a portion (a cover body 16a) of the front cover 16 excluding the screen 25 is made of a nontransparent resin such as, for example, ABS. A headlight 21 is disposed at the front end of the front cover 16 with rearview mirrors 22 disposed on both the left and right sides of the front cover 16.

The screen 25 includes an air duct 31 slanting rearwardly and upwardly to guide the air flow from the front of the vehicle to the upside.

Figure 2:
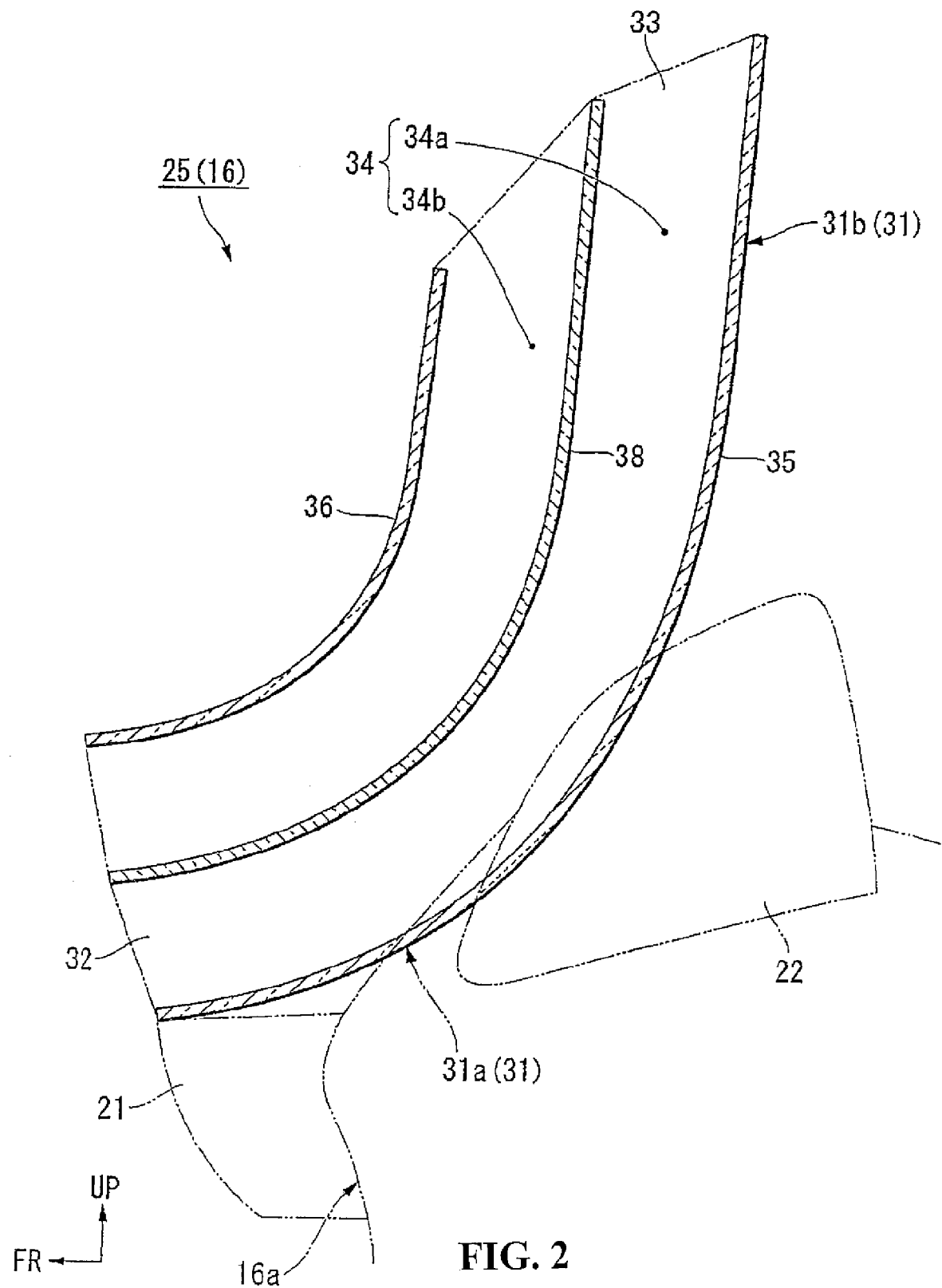
FIG. 2 is a cross-sectional view taken along a plane perpendicular to the left-right direction of a front cover of the motorcycle.

Referring to FIG. 2, the air duct 31 includes an air introduction port 32, an air blowout port 33 and an air passage 34. The air introduction port 32 is located at the lower front end of the screen 25 to open forward of the vehicle. The air blowout port 33 is located at the rear upper end of the screen 25 to open upward of the vehicle. The air passage 34 extends between the air introduction port 32 and the air blowout port 33.

The air duct 31 has a predetermined thickness in the front-back direction (the interior-exterior direction) of the screen 25 (the front cover 16). The air duct 31 is provided to in the rear (the inside of the vehicle, inside the screen 25) from the front surface (the exterior surface) thereof. The front portion (the lower portion) of the air duct 31 is formed as a curved portion 31a concavely curved to have a steeper slant as it goes rearwardly (upwardly). The upper portion of the air duct 31 is formed as a linearly extending straight portion 31b having a relatively steep slant.

Figure 3:
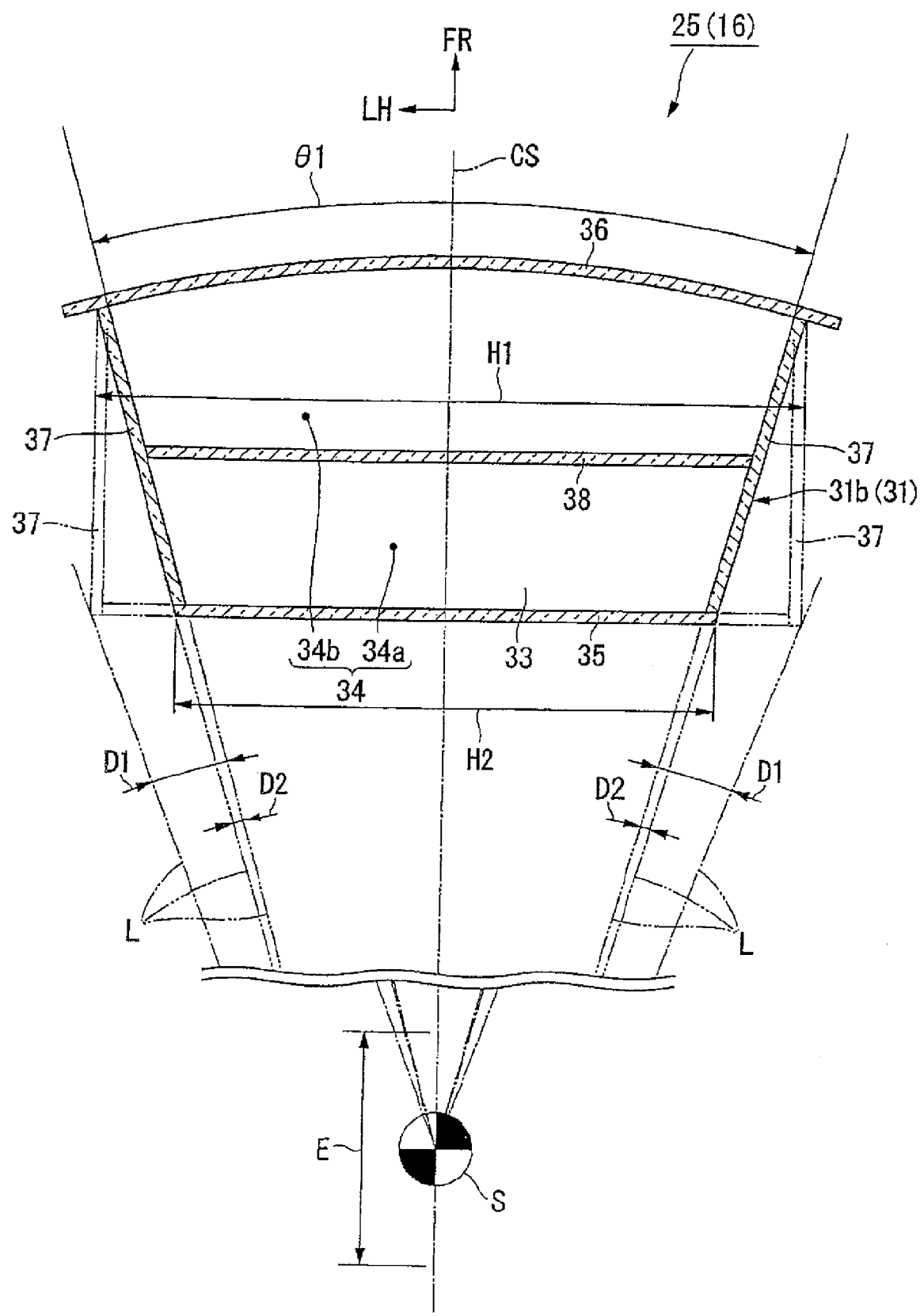
FIG. 3 is a cross-sectional view of the front cover taken along a sight-line of an occupant.

Referring to FIG. 3, the air introduction port 32 and the air blowout port 33 are each shaped to have a transversely elongate opening with a predetermined left-right width on the left-right inside of the vehicle body. The air passage 34 has almost the same sectional shape as those of the air introduction port 32 and of the air blowout port 33. In addition, the air passage 34 extends uniformly in cross-section along the curved portion 31a and along the straight portion 31b. The screen 25 (the front cover 16) including the air duct 31 is provided symmetrically with respect to the left-right center plane CS of the vehicle body.

The air duct 31 has a hollow, transversely elongate cross-sectional shape to form the air passage 34. A rear (vehicle-inside) wall portion and a front (vehicle-outside) wall portion of the air duct 31 are referred to as the rear wall 35 and the front wall 36, respectively. In addition, wall portions on both the left and right sides are respectively referred to as left and right lateral walls 37.

The front and rear walls 35, 36 are each formed like a plate extending substantially in the left-right direction and extending along the curved portion 31a and along the straight portion 31b. In addition, the front wall 36 gently curves to protrude vehicle-outwardly (forwardly) in cross-section of the air duct 31.

On the other hand, the left and right lateral walls 37 are each formed like a plate crossing the left-right direction at a predetermined angle as detailed later. In addition, the left and right lateral walls 37 each extend along the curbed portion 31a and along the straight portion 31b as with the front and rear walls 35, 36.

A partition wall 38 is provided between the respective intermediate portions of the left and right lateral walls 37 in the front-back direction of the screen 25 so as to separate the air passage 34 into an inner passage 34a and an outer passage 34b. The partition wall 38 is formed like a plate extending generally in the left-right direction and along the curved portion 31a and along the straight portion 31b. The inner and outer passages 34a, 34b have almost the same thickness in the front-back direction of the screen 25. The partition wall 38 functions as a guide plate for the air flow flowing in the entire air passage 34.

With such a screen 25 described above, during operation of the motorcycle 1, the air flow flowing from the front to the rearward generally horizontally is allowed to flow obliquely upwardly and rearwardly along the external surface of the air duct 31. In addition, a portion of the air flow is taken into the air duct 31 from the air introduction port 32 (see arrow A in FIG. 1). The air flow is blown out from the air blowout port 33 while having such directional characteristics as to face the oblique upside and rearward and while changing its flowing direction of the air flow to the upside along the air duct 31 (see arrow B in FIG. 1).

The air flow blown out from the air blowout port 33 functions to change also the flow of the air flow passing above the screen 25 and reaching the occupant J to the oblique upward and rearward (see arrow C in FIG. 1). Thus, the windshield unit can lead the entire running wind about to reach the occupant J to avoid the occupant J (for example, providing a satisfactory windshield effect) while suppressing the height of the screen 25 (the height of the front cover 16).

The occupant J will obtain sight through the screen 25, through the straight portion 31b rising in front thereof. However, as shown in FIG. 3, the left and right lateral walls 37 of the air duct 31 may entirely be formed like plates generally perpendicular to the left-right direction (indicated with chain lines in FIG. 3). In such a case, if viewed from an occupant's view point S at the riding position, the left and right lateral walls 37 are each viewed to have a relatively wide left-right width D1.

For this reason, in the screen 25, a portion, of each of the left and right lateral walls 37, located at least in the straight portion 31b is slanted to be located more left-right inwardly as it goes rearwardly. In other words, the air duct 31 is provided so that at least in the straight portions 31b the left-right width (H2) of the rear wall 35 (more specifically, the left-right width between the left and right lateral walls 37) located on the rear side may be narrower than the left-right width H1 of the front wall 36 located forward of the straight portion 31b (more specifically, the left-right width between the left and right lateral walls 37 in the front wall 36).

In the cross-section illustrated in FIG. 3, the left and right lateral walls 37 are each provided so that an inclination angle relative to the vehicle body left-right center plane CS may be set at 15°. In other words, an angle θ1 formed between the left and right lateral walls 37 may be set at 30°. This angle θ1 is set so that the left and right lateral walls 37 may each be substantially parallel to a line of sight L extending from the occupant's view point S to each of the left and right lateral walls 37. Thus, when viewed from the occupant's view point, the left and right lateral walls 37 will each be seen so as to have a small left-right width D2 approximately equal to the thickness of each of the left and right lateral walls.

A range E in FIG. 3 indicates a standard layout range of the occupant's view point S rearward of the straight portion 31b. If an angle θ1 formed between the left and right lateral walls 37 is in a range from 25° to 35° with respect to the occupant's view point S located in the range E, the left and right lateral walls 37 is generally parallel to the sight line L. Thus, the left and right lateral walls 37 will each be viewed to have a small left-right width D2.

As described above, the windshield unit (the screen 25) of the motorcycle 1 according to the embodiment is provided at the front center of the vehicle body with an air duct 31 adapted to allow the air introduction port 32 opening forward of the vehicle to communicate with the air blowout port 33 opening upward of the vehicle. In this windshield unit, the air duct 31 includes the curved portion 31a extending rearwardly from the air introduction port 32 and the straight portion 31b being contiguous with the curved portion 31a, rising in front of the occupant and reaching the air blowout port 33. The straight portion 31b is provided so that the left-right width H2 of the rear wall 35 rearwardly of the straight portion may be narrower than the left-right width H1 of the front wall 36 forward of the straight portion.

With the configuration described above, when the left and right lateral walls 37 are viewed from the occupant's view point S, the left-right width D2 of each of the left and right lateral walls 37 included in the straight portion 31b rising in front of the occupant is suppressed to broaden a view through the screen 25. This can enhance a sense of space at the riding position.

In the windshield unit described above, the left and right lateral walls 37 of the straight portion 31b are slantly provided to reduce the interval therebetween as they go rearwardly. The left and right lateral walls 37 of the straight portion 31b in front of the occupant will each slant to extend along the sight line L extending from the occupant's view point S rearward of the left and right lateral walls. Thus, when the left and right lateral walls 37 are viewed from the occupant's view point, the left-right width D2 of each of the left and right lateral walls 37 can further be reduced.

Further, in the windshield unit described above, the angle θ1 formed between the left and right lateral walls 37 is set in a range from 25° to 35°. Thus, when the left and right lateral walls 37 of the straight portion 31b are viewed, the left-right width D2 of each of the left and right lateral walls 37 can be reduced with respect to the occupant's view point S located in the standard range E rearward of the straight portion 31b.

Figure 4:
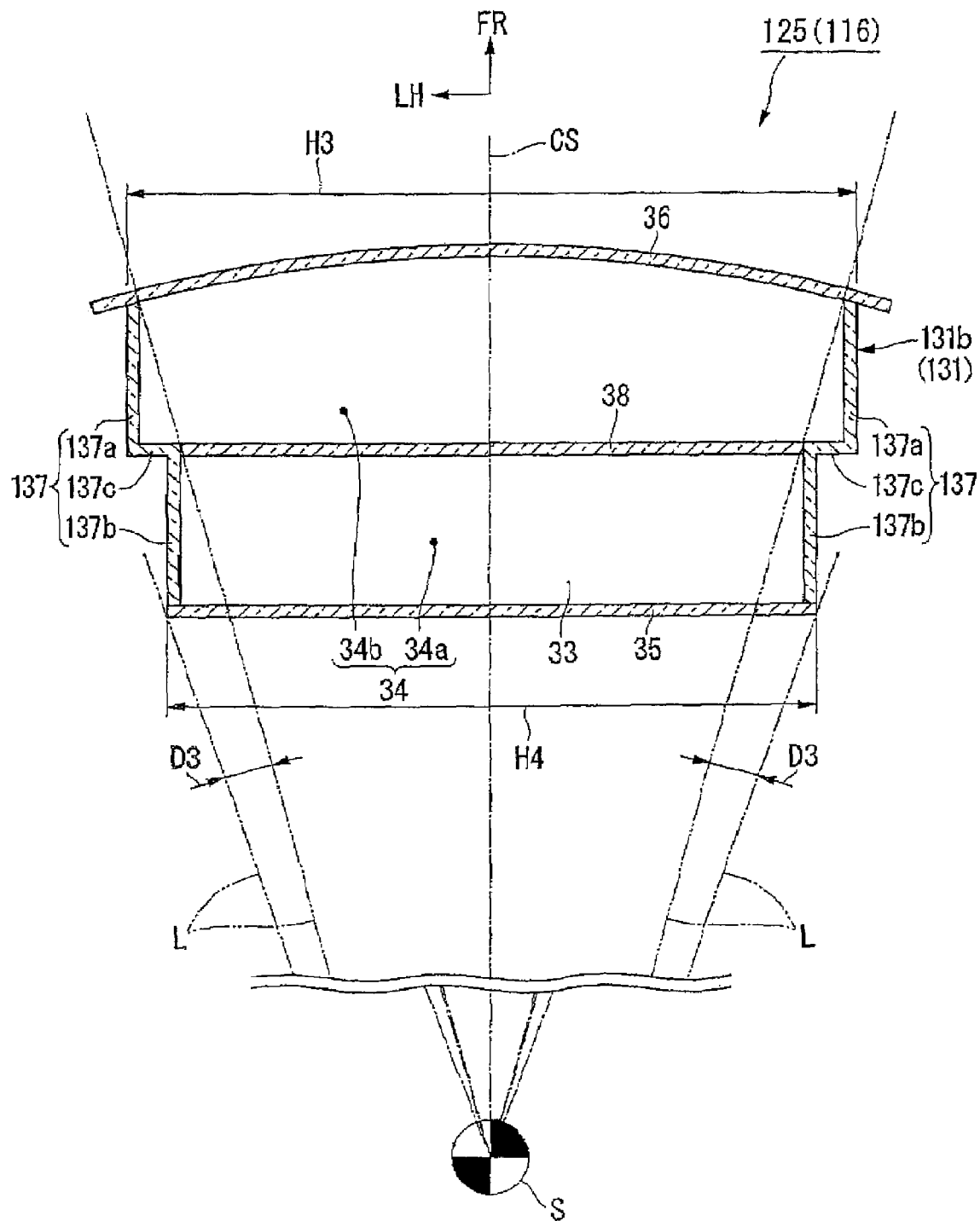
FIG. 4 is a cross-sectional view illustrating a second embodiment of the present invention, corresponding to FIG. 3.

A second embodiment of the present invention will next be described with reference to FIG. 4.

A screen 125 (a front cover 116) of the second embodiment is different from the screen of the first embodiment in that left and right lateral walls 137 at least in a straight portion 131b of an air duct 131 are formed stepwise to gradually reduce the intervals therebetween as they go rearward. The same portions as those of the first embodiment are labeled with like reference numerals and their explanations are omitted.

The left and right lateral walls 137 each include front and rear lateral walls 137a, 137b substantially perpendicular to the left-right direction. The front and rear lateral walls 137a, 137b are connected with each other via a step-difference wall 137c substantially parallel to the left-right direction. In this way, the left and right lateral walls 137 are provided stepwise so that the interval between the rear lateral walls 137b may be narrower than that between the front lateral walls 137a. Thus, a left-right width H4 of the rear wall 35 (the left-right width between the rear lateral walls 137b) is narrower than a left-right width H3 of the front wall 36 (the left-right width between the front lateral walls 137a). When the left and right lateral walls 137 are viewed from the occupant's view point S, the left-right width D3 of each of the left and right lateral walls 137 can be reduced compared with that of the flat plate-like left and right lateral walls 37 indicated with the chain lines in FIG. 3.

Figure 5:
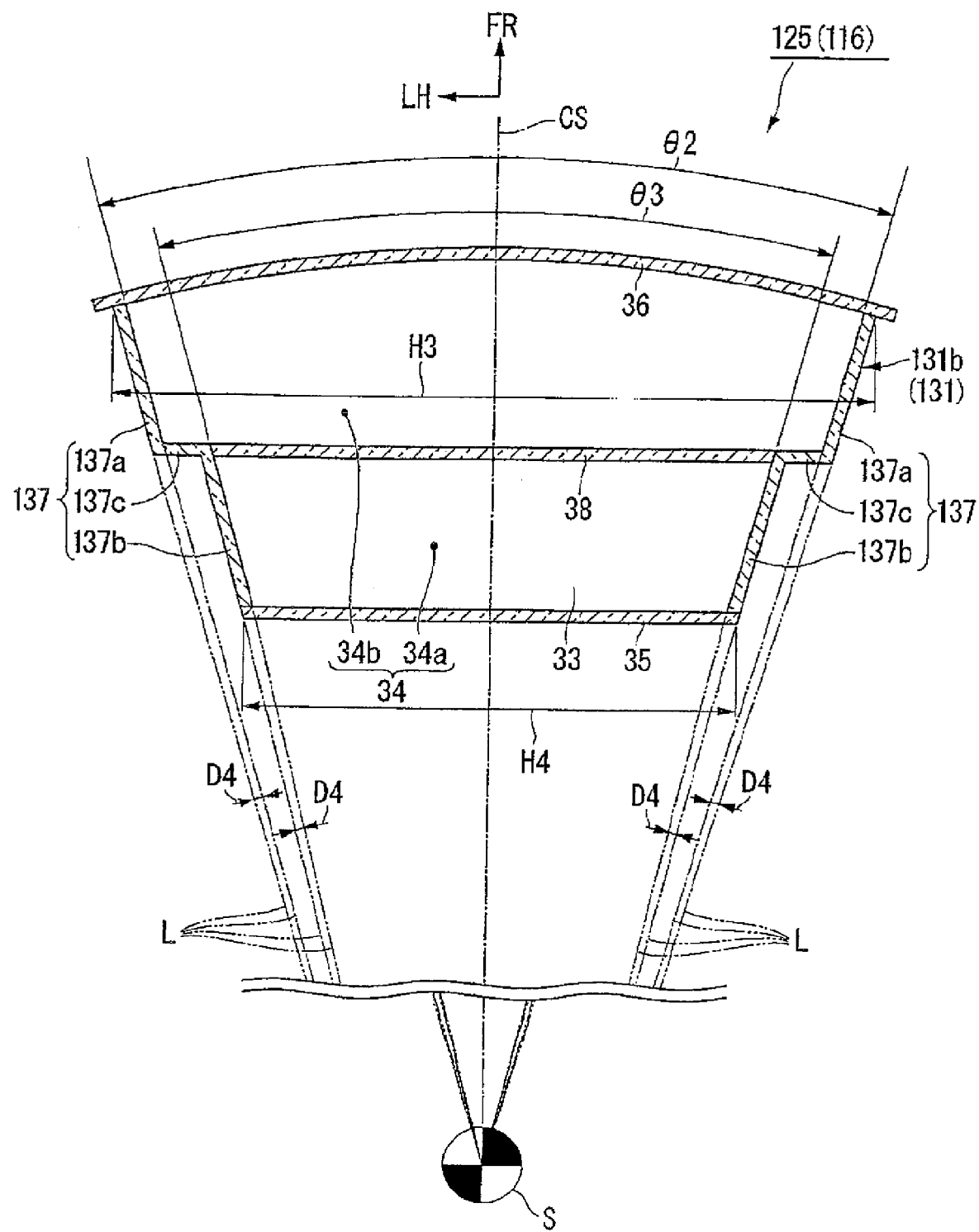
FIG. 5 is a cross-sectional view illustrating a modification of the second embodiment, corresponding to FIG. 3.

With reference to FIG. 5, at least one of the front and rear lateral walls 137a, 137b included in each of the left and right lateral walls 137 is slantly constructed so as to be located more left-right inwardly as it goes rearwardly. This can further reduce the left-right width D4 of each of the left and right lateral walls 137 when the left and right lateral walls 137 are viewed from the occupant's view point S. In addition, an angle θ2 formed between the front lateral walls 137a and an angle θ3 formed between the rear lateral walls 137b are each set in a range from 25° to 35° as with the angle θ1 formed between the left and right lateral walls 37 described earlier.

As described above, also in the windshield unit (the screen 125) of the embodiment described above, the left-right widths D3, D4 of each of the left and right lateral walls 137 in the straight portion 131b rising in front of the occupant can be reduced, as with the first embodiment, when the left and right lateral walls 137 are viewed from the occupant's view point S. Thus, the view through the screen 125 is broadened to enhance a sense of space at the riding position.

In addition, the present invention is not limited to the embodiments described above. For example, the portion (the introduction portion) of the air duct 31, 131 close to the air introduction port 32 is not limited to the curved shape and similarly the portion (the rising portion) close to the air blowout port 33 is not limited to the linear shape. The air duct 31, 131 may be formed as a single air passage 34 not having the partition wall 38 or formed to have a plurality of the partition walls 38.

The configuration of the above embodiment is one example of the present invention and, needless to say, may be applicable to motorcycles, three- or four-wheeled saddle-ride type vehicles in addition to scooter type vehicles. Various modifications may obviously be enabled in the range not departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield unit for a vehicle provided at the front center of a vehicle body with an air duct adapted to allow an air introduction port opening toward a front of the vehicle to communicate with an air blowout port opening toward an upside of the vehicle comprising:
   an air duct introduction portion extending rearwardly from the air introduction port and a rising portion being contiguous with the introduction portion, rising in front of a driver, and reaching the air blowout port; and
   the rising portion is provided so that a left-right width of a rear wall of the air duct is narrower than that of a front wall of the air duct forward of the rising portion.

2. The windshield unit for the vehicle according to claim 1, wherein left and right lateral walls of the rising portion are slantly provided to gradually narrow an interval therebetween as the left and right lateral walls extend rearwardly.

3. The windshield unit for the vehicle according to claim 2, wherein an angle formed between the left and right lateral walls is set in a range from 25° to 35°.

4. The windshield unit for the vehicle according to claim 1, wherein the air duct includes a forward air duct and a rearward air duct disposed relative to each other for forming two passageways for a flow of air from the air duct introduction portion to the air blowout port.

5. The windshield unit for the vehicle according to claim 1, wherein the air introduction port is disposed in a forward direction of the vehicle and the rising portion is a curved portion concavely curved to have a steeper slant as the rising portion extends upwardly to the air blowout port.

6. The windshield unit for the vehicle according to claim 4, wherein a partition wall is disposed between the front wall and the rear wall for separating the air duct into an inner passage and an outer passage.

7. The windshield unit for the vehicle according to claim 4, and further including a left lateral wall extending from a left side of the forward air duct to a left side of the rearward air duct and a right lateral wall extending from a right side of the forward air duct to a right side of the rearward air duct.

8. The windshield unit for the vehicle according to claim 7, wherein the left and right lateral walls extend continuously from the forward air duct to the rearward air duct.

9. The windshield unit for the vehicle according to claim 6, wherein a left front lateral wall extends from a left side of the forward air duct to a left side of the partition wall and a right front lateral wall extends from a right side of the forward air duct to a right side of the partition wall and a left rear lateral wall extends from the left side of the partition wall to a left side of the rear wall and a right rear lateral wall extends from the right side of the partition wall to a right side of the rear wall, said left front lateral wall and said right front lateral wall being displaced a predetermined distance outwardly relative to the left rear lateral wall and the right rear lateral wall.

10. The windshield unit for the vehicle according to claim 6, wherein a left front lateral wall extends at an angle from a left side of the forward air duct to a left side of the partition wall and a right front lateral wall extends at an angle from a right side of the forward air duct to a right side of the partition wall and a left rear lateral wall extends at an angle from the left side of the partition wall to a left side of the rear wall and a right rear lateral wall extends at an angle from the right side of the partition wall to a right side of the rear wall, said left front lateral wall and said right front lateral wall being displaced a predetermined distance outwardly relative to the left rear lateral wall and the right rear lateral wall and extending at an angle substantially parallel to each other.

11. A windshield unit adapted for use with a vehicle comprising:
   an air duct adapted to be positioned at a front center of a vehicle body, said air duct providing for a flow of air from an air introduction port opening toward the front of the vehicle to an air blowout port opening toward an upside of the vehicle;
   an air duct introduction portion extending rearwardly from the air introduction port;
   a rising portion being contiguous with the air duct introduction portion, said rising portion rising in front of a driver, and reaching the air blowout port;
   a rear wall forming one wall of the rising portion;
   a front wall forming one wall of the rising portion;
   a left-right width of the rear wall of the air duct being narrower relative to the front wall of the air duct forward of the rising portion.

12. The windshield unit adapted for use with the vehicle according to claim 11, wherein left and right lateral walls of the rising portion are slantly provided to gradually narrow an interval therebetween as the left and right lateral walls extend rearwardly.

13. The windshield unit adapted for use with the vehicle according to claim 12, wherein an angle formed between the left and right lateral walls is set in a range from 25° to 35°.

14. The windshield unit adapted for use with the vehicle according to claim 11, wherein the air duct includes a forward air duct and a rearward air duct disposed relative to each other for forming two passageways for a flow of air from the air duct introduction portion to the air blowout port.

15. The windshield unit adapted for use with the vehicle according to claim 11, wherein the air introduction port is disposed in a forward direction of the vehicle and the rising portion is a curved portion concavely curved to have a steeper slant as the rising portion extends upwardly to the air blowout port.

16. The windshield unit adapted for use with the vehicle according to claim 14, wherein a partition wall is disposed between the front wall and the rear wall for separating the air duct into an inner passage and an outer passage.

17. The windshield unit adapted for use with the vehicle according to claim 14, and further including a left lateral wall extending from a left side of the forward air duct to a left side of the rearward air duct and a right lateral wall extending from a right side of the forward air duct to a right side of the rearward air duct.

18. The windshield unit adapted for use with the vehicle according to claim 17, wherein the left and right lateral walls extend continuously from the forward air duct to the rearward air duct.

19. The windshield unit adapted for use with the vehicle according to claim 16, wherein a left front lateral wall extends from a left side of the forward air duct to a left side of the partition wall and a right front lateral wall extends from a right side of the forward air duct to a right side of the partition wall and a left rear lateral wall extends from the left side of the partition wall to a left side of the rear wall and a right rear lateral wall extends from the right side of the partition wall to a right side of the rear wall, said left front lateral wall and said right front lateral wall being displaced a predetermined distance outwardly relative to the left rear lateral wall and the right rear lateral wall.

20. The windshield unit adapted for use with the vehicle according to claim 16, wherein a left front lateral wall extends at an angle from a left side of the forward air duct to a left side of the partition wall and a right front lateral wall extends at an angle from a right side of the forward air duct to a right side of the partition wall and a left rear lateral wall extends at an angle from the left side of the partition wall to a left side of the rear wall and a right rear lateral wall extends at an angle from the right side of the partition wall to a right side of the rear wall, said left front lateral wall and said right front lateral wall being displaced a predetermined distance outwardly relative to the left rear lateral wall and the right rear lateral wall and extending at an angle substantially parallel to each other.

* * * * *